May 3, 1938. G. AURIEN 2,116,297
METHOD OF DRAWING DOUBLE WALLED WINDOWPANES
Filed June 17, 1937 2 Sheets-Sheet 1

INVENTOR:
GEORGE AURIEN,
BY J.H.S.Cook,
ATTORNEY.

May 3, 1938.  G. AURIEN  2,116,297
METHOD OF DRAWING DOUBLE WALLED WINDOWPANES
Filed June 17, 1937  2 Sheets-Sheet 2
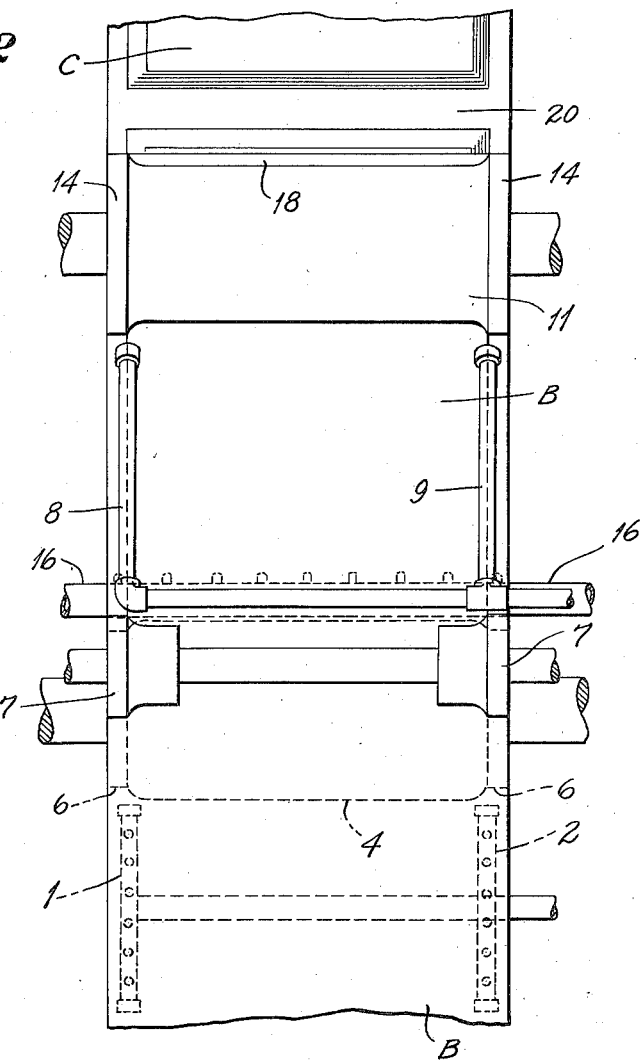
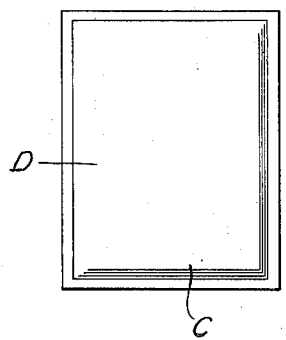
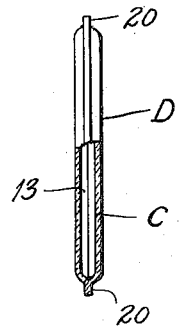
INVENTOR:
GEORGE AURIEN,
BY J. H. Cooke
ATTORNEY.

Patented May 3, 1938

2,116,297

UNITED STATES PATENT OFFICE 2,116,297

METHOD OF DRAWING DOUBLE WALLED WINDOWPANES

George Aurien, Clayton, Mo.

Application June 17, 1937, Serial No. 148,651

4 Claims. (Cl. 49—83.1)

My invention is a new method of drawing double walled window panes in which the two glass walls are separated by a dead air space, with the sides and ends integrally joined together. The primary object of my invention is to produce in a new and novel manner a double walled pane of glass that will be resistant to the conductivity through said glass pane of heat and cold.

Air-conditioning of buildings is burdened by the large number of windows usually placed in buildings used for office, home, and analagous purposes. This is due primarily to the tendency of single walled window panes to conduct heat and cold through such single walled panes. Great difficulty has heretofore been experienced in producing a double walled glass window pane having the sides and ends integrally joined together so that such union would not be subjected to disintegration, either through the lapse of time or other causes. I have discovered a new method of producing such a pane which is relatively inexpensive to operate and will produce a double walled pane at only a small cost over the single pane of glass.

By my new method I succeed in integrally joining my double walled pane at the sides and ends so that at such junctures the sheet is homogeneous, and yet throughout the surface of the space between the separated walls dead air is maintained as it may have been incorporated in the structure when it was being formed. The double walled pane is extremely slow in conducting either heat or cold through the pane structure, and is therefore very important as a factor in keeping out either heat or cold, whichever may be the outside prevailing weather condition, as well as preventing the escape of heat or cold from the building, as the case may be.

The prime object of my invention is to rapidly and efficaciously produce double walled glass window panes which are highly desirable for proper air-conditioning in the usual types of building construction.

Fig. 2 is another view of the same taken at a right angle to the view shown in Fig. 1.

Fig. 3 is a face view of my double walled glass window pane.

Fig. 4 is a side view, partly in section, of the same.

Figure 1:
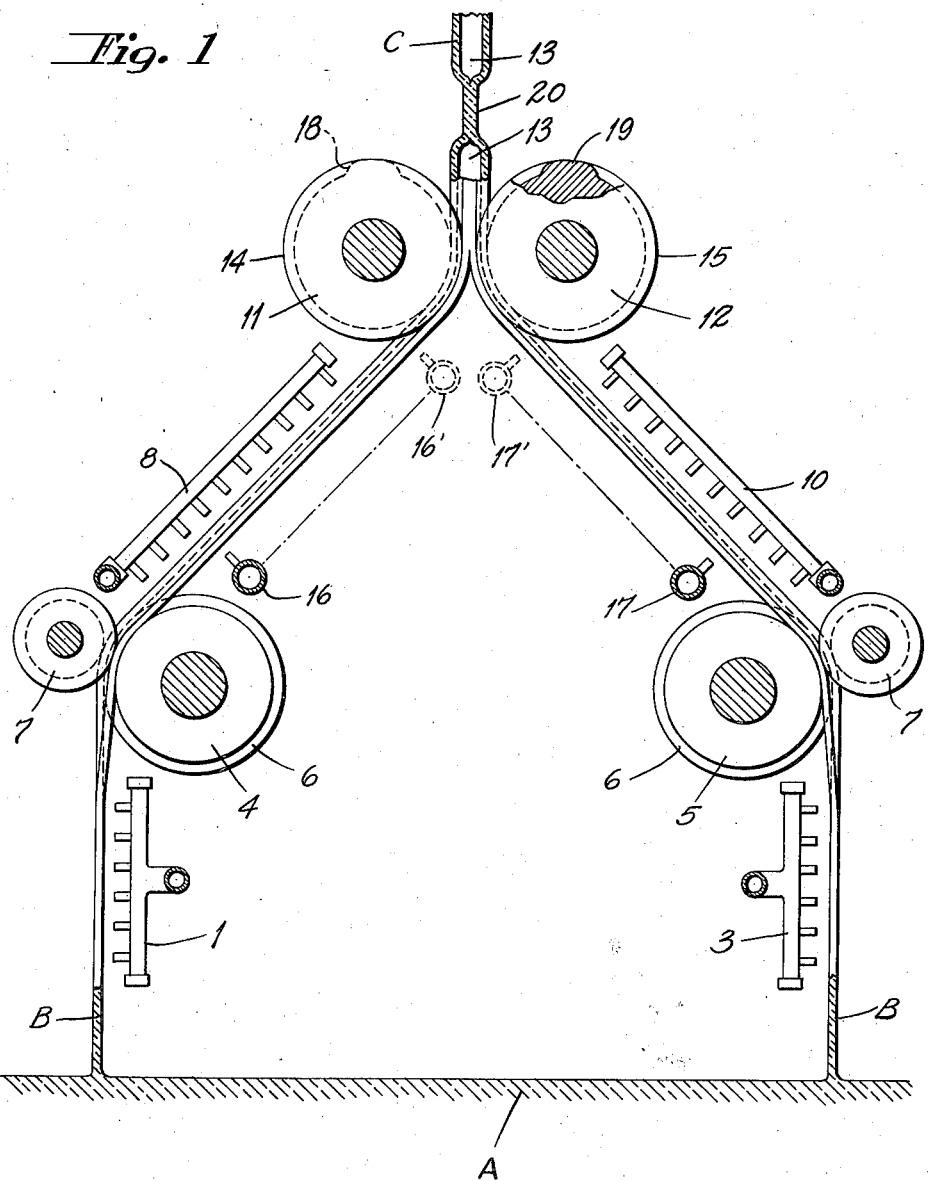
Fig. 1 is a diagrammatical view of the mechanical methods employed in forming my double walled glass window pane.

In the drawings, A designates a vat of molten glass of the usual type employed in glass making. The glass sheets B—B are drawn up from the molten mass in a manner well understood in the art of sheet glass manufacture. The thickness of the sheet is determined by the speed with which this withdrawal takes place as well as by the temperature of the body of glass, as is also well understood in the sheet glass making art. While usually only one sheet is withdrawn from the molten mass at a time, I withdraw two sheets B and B simultaneously. The two sheets are drawn upwardly as shown in Fig. 1, where each sheet at the edges thereof is subjected to the flame from gas burners 1 and 3 placed on each side of said sheet. In Fig. 2 the gas burners 1 and 2 are shown, while in Fig. 1 only one of the gas burners is shown, though it is to be understood that both sheets of glass B are identically treated.

After passing the gas burners just described, the sheets of glass B pass up and over the rolls 4 and 5 which tend to form the sheet of glass, which is relatively plastic at this point. At the ends of the rolls 4 and 5 a cut away portion 6 is formed to accommodate the side edges of the glass sheets. Co-operating with such cut-out portions 6 are two small crimping disks 7 which contact the edge surfaces of the upwardly traveling sheet of glass opposite the side to which the flame from the burners 1, 2, and 3 is applied. These side edges have been sufficiently softened by the flames just previously described to permit such edges to be crimped inwardly by such crimping disks against the cut away portions 6 of the rolls 4 and 5, and such edges will retain the form received from said crimping disks.

The sheets B after leaving the rolls 4 and 5 continue to travel upwardly at an angle toward two other rolls, which will be presently described.

Other gas burners 8, 9, and 10 are provided to direct flames against the side edges of the sheets B on the side, preferably, opposite that side against which the flames from the burners 1, 2, and 3 were directed. It is to be understood that there are four of such burners, one on each side of each sheet of glass. The burners 8, 9, and 10 render the side edges of the sheets B sufficiently soft so that when the sheets B pass between the second set of rolls, presently to be described, such edges may be joined integrally together.

The angularly inclined, upwardly traveling sheets of glass B—B, after passing the burners 8, 9, and 10, enter the bight of two forming rolls 11 and 12. These rolls have most of the circumferential periphery of each roll sufficiently cut away so that the glass sheets B may throughout most of their area be separated a sufficient distance from each other, after passing through such rolls, as to produce the desired separating space, as shown in Fig. 1 at 13. At the ends of the rolls 11 and 12 are flanges 14 and 15 which press against the plastic side edges of the sheets B, which side edges were subjected to the heat from the burners 8, 9, and 10, and due to such pressure and the plastic condition of such edges an integral junction between such side edges is formed.

After the glass sheets B leave the rolls 4 and 5 they are subjected to the flames from the traveling burners 16 and 17, which flames are directed preferably against the inner sides of each sheet B transversely thereof. It is necessary that the burners 16 and 17 travel at the same rate of speed and in the same direction as the upwardly moving sheets of glass B—B, so as to produce a sufficiently plastic condition transversely of each sheet of glass, so that at such point by an operation to be hereinafter described the two sheets of glass B—B may be made to integrally join with each other in a transverse line. When the burners 16 and 17 have reached the upward position shown in dotted outline 16' and 17' they are quickly dropped back to the full line position shown in Fig. 1, so that they may again travel upwardly with the glass sheets B—B at the proper spaced interval. I have only illustrated these burners diagrammatically, and any well known means for moving said burners upwardly and returning them to their starting position may be employed.

On the rolls 14 and 15 are the longitudinal projections 18 and 19 which are adapted to simultaneously engage the outside face of each of the glass sheets B. When in registration with each other the outer portions of the projections 18 and 19 are separated from each other a space equal to the space 20 formed in the glass sheets B by such projections 18 and 19 (see Fig. 1). Due to the plasticity of the glass sheets B caused by the burners 16 and 17, the pressure of the projections 18 and 19 causes said sheets to integrally join transversely at this point.

After leaving the forming rolls 14 and 15, the combined sheets of glass B, having been united into the form C shown in Fig. 1, travel to an annealing furnace, are cut into pane sizes, and are then ready for the market.

The complete pane is shown at D in Figs. 3 and 4. The view in Fig. 4 is designed to show the sides and edges of the pane D and the approximate distance between the two faces.

I claim:

1. A method of producing double walled window panes, consisting of simultaneously drawing from a vat of molten glass two sheets of glass, subjecting the side edges only of each sheet of glass to a heat sufficient to permit said edges to be bent and formed without injury to said sheets, also subjecting each of said sheets of glass at predetermined intervals only to a heat transversely of said sheets, then bringing said sheets into contact with each other at said heated portions to cause cohesion of said sheets at said portions, only and apply pressure at said heated portions sufficient to produce such cohesion.

2. A method of producing double walled window panes, consisting of simultaneously drawing from a vat of molten glass two sheets of glass, subjecting the side edges only of each sheet of glass, while said sheets are in motion, to a heat sufficient to permit said edges to be bent and formed without injury to said sheets, also subjecting each of said sheets of glass at predetermined intervals only, and while said sheets are in motion, to a heat transversely of said sheets, then bringing said sheets into contact with each other at said heated portions to cause cohesion of said sheets at said portions, only, and applying pressure at said heated portions sufficient to produce such cohesion.

3. A method of producing double walled window panes, consisting of simultaneously drawing from a vat of molten glass two sheets of glass, subjecting the side edges only of each sheet of glass, while said sheets are in motion, to a heat sufficient to permit said edges to be bent and formed without injury to said sheets, also subjecting each of said sheets of glass at predetermined intervals only, and while said sheets are in motion, to a heat transversely of said sheets, then bringing said sheets into contact with each other at said heated portions to cause cohesion of said sheets at said portions, only and applying pressure at said heated portions sufficient to produce such cohesion, the two walls of said window panes being separated from each other to provide an air space between said walls.

4. A method of producing double walled window panes, consisting of simultaneously drawing from a vat of molten glass two sheets of glass, subjecting the side edges only of each sheet of glass, while said sheets are in motion, to a heat sufficient to permit said edges to be bent and formed without injury to said sheets, also subjecting each of said sheets of glass at predetermined intervals only, and while said sheets are in motion, to a heat transversely of said sheets, then bringing said sheets into contact with each other at said heated portions to cause cohesion of said sheets at said portions, only, and applying pressure at said heated portions sufficient to produce such cohesion, the two walls of said window panes being separated from each other to provide an air space between said walls, and said sheets being subjected to an annealing treatment and severed transversely at their transverse connecting point.

GEORGE AURIEN.